US012410566B2

(12) United States Patent
Neumann

(10) Patent No.: US 12,410,566 B2
(45) Date of Patent: Sep. 9, 2025

(54) COMPACTOR ROLLER FOR A SOIL COMPACTOR

(71) Applicant: Hamm AG, Tirschenreuth (DE)

(72) Inventor: Thomas Neumann, Konnersreuth (DE)

(73) Assignee: Hamm AG, Tirchenreuth (DE)

( * ) Notice: Subject to any disclaimer, the term of this patent is extended or adjusted under 35 U.S.C. 154(b) by 945 days.

(21) Appl. No.: 17/545,172

(22) Filed: Dec. 8, 2021

(65) Prior Publication Data

US 2022/0186445 A1 Jun. 16, 2022

(30) Foreign Application Priority Data

Dec. 10, 2020 (DE) ..................... 10 2020 132 973.3

(51) Int. Cl.
*E01C 19/28* (2006.01)
*B06B 1/16* (2006.01)
*E01C 21/00* (2006.01)

(52) U.S. Cl.
CPC .............. *E01C 19/286* (2013.01); *B06B 1/16* (2013.01); *E01C 21/00* (2013.01)

(58) Field of Classification Search
CPC ....... E02D 3/046; E02D 3/074; E01C 19/286; B60B 1/16
See application file for complete search history.

(56) References Cited

U.S. PATENT DOCUMENTS 3,783,701 A 1/1974 Steprath et al.
3,909,147 A 9/1975 Takata
(Continued)

FOREIGN PATENT DOCUMENTS

DE 2140006 B1 5/1972
DE 102012201443 8/2013
(Continued)

OTHER PUBLICATIONS

Japanese Office Action of Serial No. 2021/200047 dated Jan. 10, 2023, 4 pages.
(Continued)

*Primary Examiner* — Gary S Hartmann
(74) *Attorney, Agent, or Firm* — Rankin, Hill & Clark LLP

(57) ABSTRACT

A compactor roller for a soil compactor comprises a roller shell (24), rotatable about a roller axis of rotation (W) and surrounding a roller interior (23), an oscillation/vibration assembly (28) arranged in the roller interior (23), wherein the oscillation/vibration assembly (28) comprises a first oscillation/vibration unit (30) with at least one drivable first unbalanced mass (50, 50') for rotation about a first oscillation/vibration axis of rotation ($D_1$), and a second oscillation/vibration unit (32) with at least one drivable second unbalanced mass (52, 52') for rotation about a second oscillation/vibration axis of rotation ($D_2$.) A center of mass of a second unbalanced mass part of the at least one first unbalanced mass (50, 50') and/or a center of mass of a second unbalanced mass part of the at least one second unbalanced mass (52, 52') moves, during the movement of the respective second unbalanced mass part (62, 86) between two end positions about the assigned oscillation/vibration axis of rotation ($D_1$, $D_2$) in an angle of less than 180°.

19 Claims, 3 Drawing Sheets

(56) References Cited

U.S. PATENT DOCUMENTS

| | | | |
|---|---|---|---|
| 4,647,247 A | 3/1987 | Sandström | |
| 7,213,479 B2 * | 5/2007 | Mitsui | E02D 3/026 74/61 |

FOREIGN PATENT DOCUMENTS

| | | | |
|---|---|---|---|
| DE | 202016103865 U1 | 8/2016 | |
| EP | 2881516 | 6/2015 | |
| FR | 2639376 | 5/1990 | |
| GB | 1368839 A * | 10/1974 | B06B 1/186 |
| JP | H01-036967 | 11/1989 | |
| JP | H05-054607 | 7/1993 | |
| JP | 2002-061109 | 2/2002 | |
| JP | 2003-019463 | 1/2003 | |
| JP | 2003-096713 | 4/2003 | |
| JP | 2004223313 | 8/2004 | |
| JP | 2016-191252 | 11/2016 | |

OTHER PUBLICATIONS

German Search Report for German application No. 10 2020 132 973.3, dated Oct. 26, 2021, 8 pages.

* cited by examiner

COMPACTOR ROLLER FOR A SOIL COMPACTOR

BACKGROUND

The present invention relates to a compactor roller for a soil compactor comprising a roller shell, rotatable about a roller axis of rotation and enclosing a roller interior, and an oscillation/vibration assembly arranged in the roller interior.

A compactor roller for a soil compactor according to the preamble to claim 1 is known from JP 2004-223313 A. The two oscillation/vibration units of the oscillation/vibration assembly of this known compactor roller each comprise a first unbalanced mass part of a respective unbalanced mass, fixedly supported on an oscillation/vibration shaft which is rotatable about a respective oscillation/vibration axis of rotation, and comprise a second unbalanced mass part, supported on an outer circumferential surface of the oscillation/vibration shaft to be pivotable about the respective oscillation/vibration axis of rotation relative to the respective first unbalanced mass part.

Depending on the direction of rotation of the two unbalanced mass parts about the respectively assigned oscillation/vibration axes of rotation, the centers of mass of the two unbalanced mass parts are arranged with a phase offset of 180° to one another with respect to the respective oscillation/vibration axis of rotation for each of the two oscillation/vibration units, so that, for each of the oscillation/vibration units, a resulting unbalanced torque arises from the difference of the unbalanced torques of the two unbalanced mass parts, or are arranged on the same side with respect to the respective oscillation/vibration axis of rotation, thus arranged without a phase offset, so that a resulting unbalanced torque arises from the sum of the unbalanced torques of the respective unbalanced mass parts. Furthermore, depending on the direction of rotation, the centers of mass of the respective unbalanced masses comprising the two unbalanced mass parts of the two oscillation/vibration units lie at an angular offset of 180° to one another or have no phase offset to one another, so that, depending on the direction of rotation, it may be switched between a vibration operation, in which the respective centrifugal forces acting on the center of mass are equally large and identically directed for the two oscillation/vibration units, and thus a total centrifugal force arises substantially orthogonal to the roller axis of rotation, or an oscillation operation, in which the two centrifugal forces generated at the oscillation/vibration units are equally large yet directed opposite one another, so that a resulting torque is generated acting tangential or in the circumferential direction and the compactor roller is periodically accelerated back and forth about the roller axis of rotation.

The switching between the two operating states is achieved in that, for the two oscillation/vibration units, the respective second unbalanced mass part pivots by an angle of 180° relative to the respective first unbalanced mass part about the assigned oscillation/vibration axis of rotation, so that, in each of the two settings of the second unbalanced mass parts, the center of mass lies on a common radial line with the center of mass of the respectively assigned first unbalanced mass part.

BRIEF DESCRIPTION

It is the object of the present invention to provide a compactor roller for a soil compactor comprising an oscillation/vibration assembly, in which a change of the unbalanced torque, arising from the switch between an oscillation operation and a vibration operation, is achievable with a compact design of the oscillation/vibration units.

According to the invention, this problem is solved by a compactor roller for a soil compactor comprising a roller shell, rotatable about a roller axis of rotation and enclosing a roller interior, an oscillation/vibration assembly arranged in the roller interior, wherein the oscillation/vibration assembly comprises:

- a first oscillation/vibration unit with at least one drivable first unbalanced mass for rotation about a first oscillation/vibration axis of rotation, wherein the at least one first unbalanced mass comprises a first unbalanced mass part and a second unbalanced mass part, movable with respect to the first unbalanced mass part about the first oscillation/vibration axis of rotation between two end positions, wherein, during rotation of the at least one first unbalanced mass about the first oscillation/vibration axis of rotation in a first direction of rotation, the second unbalanced mass part of the at least one first unbalanced mass is in its first end position, and during rotation of the at least one first unbalanced mass about the first oscillation/vibration axis of rotation in a second direction of rotation opposite the first direction of rotation, the second unbalanced mass part of the at least one first unbalanced mass is in its second end position, wherein during movement of the second unbalanced mass part of the at least one first unbalanced mass between its first end position and its second end position, a center of mass of the second unbalanced mass part of the at least one first unbalanced mass moves about the first oscillation/vibration axis of rotation in a first predetermined angle,
- a second oscillation/vibration unit with at least one drivable second unbalanced mass for rotation about a second oscillation/vibration axis of rotation, wherein the at least one second unbalanced mass comprises a first unbalanced mass part and a second unbalanced mass part, movable with respect to the first unbalanced mass part about the second oscillation/vibration axis of rotation between two end positions, wherein, during rotation of the at least one second unbalanced mass about the second oscillation/vibration axis of rotation in a first direction of rotation, the second unbalanced mass part of the at least one second unbalanced mass is in its first end position, and during rotation of the at least one second unbalanced mass about the second oscillation/vibration axis of rotation in the second direction of rotation, the second unbalanced mass part of the at least one second unbalanced mass is in its second end position, wherein during movement of the second unbalanced mass part of the at least one second unbalanced mass between its first end position and its second end position, a center of mass of the second unbalanced mass part of the at least one second unbalanced mass moves about the second oscillation/vibration axis of rotation in a second predetermined angle, wherein, for the second unbalanced mass part of the at least one first unbalanced mass, positioned in its first end position, and for the second unbalanced mass part of the at least one second unbalanced mass, positioned in its first end position, a center of mass of the at least one first unbalanced mass and a center of mass of the at least one second unbalanced mass do not have a substantial phase offset to one another, and a first centrifugal force acting in the center of mass of the at least one first unbalanced mass and a second centrifugal force acting in the center of mass of the at least one second unbalanced mass are oriented substantially identically to one another and have a substantially identical first centrifugal force value, wherein, for the second unbalanced mass part of the at least one first unbalanced mass, positioned in its second end position, and for the second unbalanced mass part of the at least one second unbalanced mass, positioned in its second end position, the center of mass of the at least one first unbalanced mass and the center of mass of the at least one second unbalanced mass have a phase offset to one another in the range of 180°, and the first centrifugal force acting in the center of mass of the at least one first unbalanced mass and the second centrifugal force acting in the center of mass of the at least one second unbalanced mass are oriented substantially opposite to one another and have a substantially identical second centrifugal force value.

According to the invention, the first predetermined angle is less than 180° or greater than 180°, and/or the second predetermined angle is less than 180° or greater than 180°.

For the structure according to invention of a compactor roller, a compact design of the respective unbalanced mass is facilitated by an enveloping angle not equal to 180°, in particular by an enveloping angle of less than 180°.

In order to also guarantee, with this type of comparatively short movement path of a respective second unbalanced mass part, that, the defined positioning of the centers of mass of the two unbalanced masses in the different directions of rotation is achieved with a phase offset of 180° or without a phase offset to one another, it is proposed that, for the second unbalanced mass part of the at least one first unbalanced mass, positioned in its second end position, the center of mass of the second unbalanced mass part of the at least one first unbalanced mass and a center of mass of the first unbalanced mass part of the at least one first unbalanced mass do not lie on a common radial line intersecting the first oscillation/vibration axis of rotation, and/or that for the second unbalanced mass part of the at least one second unbalanced mass, positioned in its second end position, the center of mass of the second unbalanced mass part of the at least one second unbalanced mass, and a center of mass of the first unbalanced mass part of the at least one second unbalanced mass do not lie on a common radial line intersecting the second oscillation/vibration axis of rotation.

In particular, it may thereby be provided that, for the second unbalanced mass part of the at least one first unbalanced mass, positioned in its first end position, and for the second unbalanced mass part of the at least one first unbalanced mass, positioned in its second end position, the center of mass of the second unbalanced mass part of the at least one first unbalanced mass and the center of mass of the first unbalanced mass part of the at least one first unbalanced mass lie in the circumferential direction on both sides of a common radial line intersecting the first oscillation/vibration axis of rotation, and/or that for the second unbalanced mass part of the at least one second unbalanced mass, positioned in its first end position, and for the second unbalanced mass part of the at least one second unbalanced mass, positioned in its second end position, the center of mass of the second unbalanced mass part of the at least one second unbalanced mass, and the center of mass of the first unbalanced mass part of the at least one second unbalanced mass lie in the circumferential direction on both sides of a common radial line intersecting the second oscillation/vibration axis of rotation.

In order to guarantee a suitable change of the unbalanced torques during envelopment of the second unbalanced mass parts, it is further proposed that, when the first predetermined angle and the second predetermined are less than 180°, then the first predetermined angle is greater than the second predetermined angle, and that when the first predetermined angle and the second predetermined angle are greater than 180°, then the first predetermined is smaller than the second predetermined angle.

The previously described compact structure is enabled, according to the principles of the present invention for an embodiment, also depicting an independent aspect of the invention, in that a first guideway with a radially-inwardly oriented guideway surface normal is provided on the first unbalanced mass part of the at least one first unbalanced mass for moving the second unbalanced mass part of the at least one first unbalanced mass, supported radially outwardly on the first guideway, between its first end position and its second end position, and that a second guideway with a radially-inwardly oriented guideway surface normal is provided on the first unbalanced mass part of the at least one second unbalanced mass for moving the second unbalanced mass part of the at least one first unbalanced mass, supported radially outwardly on the second guideway, between its first end position and its second end position. Due to the support of the respective second unbalanced mass part radially outwardly on respective guideways oriented radially inwardly, it is possible to shift the second unbalanced mass part or its center of mass comparatively far radially outward, so that even second unbalanced mass parts with comparatively low masses contribute to a comparatively large unbalanced torque due to the large radial distance to the respective oscillation/vibration axis of rotation, and are thus able to induce the compensation or addition of the individual unbalanced torques of the unbalanced mass parts in the desired amount necessary for the switching behavior.

Since the second unbalanced mass parts only have to move across a limited angular range of approximately 180° about the respectively assigned oscillation/vibration axis of rotation to switch between an oscillation operation and a vibration operation, it is further proposed for a compact design that the first guideway only extends across a partial circumferential area about the first oscillation/vibration axis of rotation, and that the second guideway only extends across a partial circumferential area about the second oscillation/vibration axis of rotation.

In order to be able to easily achieve the switch between different total unbalanced torques in the same amount for the two oscillation/vibration units, it is further proposed that a radial distance of the first guideway to the first oscillation/vibration axis of rotation substantially corresponds to a radial distance of the second guideway to the second oscillation/vibration axis of rotation.

In order to eliminate the influence of a frictional effect caused by centrifugal force during the movement between the different end positions, it is further proposed that the second unbalanced mass part of the at least one first unbalanced mass comprises at least one first rolling body, rolling along the first guideway during movement between the first end position and the second end position, and that the second unbalanced mass part of the at least one second unbalanced mass comprises at least one second rolling body, rolling along the second guideway during movement between the first end position and the second end position.

To provide different unbalanced torques for the two second unbalanced mass parts, the number of first rolling bodies may thereby differ from the number of second rolling bodies.

In order to keep the number of differently configured components as low as possible, all first rolling bodies and all second rolling bodies may be designed identically to one another.

For greater freedom with respect to the switching behavior, in one advantageous embodiment, at least one first rolling body may differ from at least one second rolling body.

In order to be able to achieve a symmetrical effect of the two oscillation/vibration units, is is proposed that the first oscillation/vibration axis of rotation and the second oscillation/vibration axis of rotation are arranged substantially parallel to one another and to the roller axis of rotation, and/or that the first oscillation/vibration axis of rotation and the second oscillation/vibration axis of rotation have an angular distance of approximately 180° with respect to the roller axis of rotation.

The first unbalanced mass part of the at least one first unbalanced mass may be supported on a first oscillation/vibration shaft, rotatably drivable about the first oscillation/vibration axis of rotation, and/or the first oscillation/vibration shaft may provide at least one part of the first unbalanced mass part of the at least one first unbalanced mass, and that the first unbalanced mass part of the at least one second unbalanced mass may be supported on a second oscillation/vibration shaft, rotatably drivable about the second oscillation/vibration axis of rotation, and/or the second oscillation/vibration shaft may provide at least one part of the first unbalanced mass part of the at least one second unbalanced mass.

In order to be able to set the different oscillation/vibration units into operation, it is proposed that the oscillation/vibration assembly comprises an oscillation/vibration drive, and that the at least one first unbalanced mass of the first oscillation/vibration unit and the at least one second unbalanced mass of the second oscillation/vibration unit are drivable by the oscillation/vibration drive to rotate in the same direction of rotation and at the same rotational speed.

In order to be able to provide a sufficiently large mass for the oscillation/vibration units, it is proposed that the first oscillation/vibration unit comprises two first unbalanced masses, arranged spaced apart from one another in the direction of the first oscillation/vibration axis of rotation and preferably designed identically to one another, and/or that the second oscillation/vibration unit comprises two second unbalanced masses, arranged spaced apart from one another in the direction of the second oscillation/vibration axis of rotation and preferably designed identically to one another.

In order to also be able to achieve a change in the size of the force acting respectively on a compactor roller during switching between an oscillation operation and a vibration operation, thus when changing the direction of rotation of the unbalanced masses, it is further proposed that the second centrifugal force value is greater than the first centrifugal force value.

This may be achieved, for example, in that an unbalanced torque of the first unbalanced mass part of the at least one first unbalanced mass substantially corresponds to an unbalanced torque of the second unbalanced mass part of the at least one second unbalanced mass, and that an unbalanced torque of the first unbalanced mass part of the at least one second unbalanced mass substantially corresponds to an unbalanced torque of the second unbalanced mass part of the at least one first unbalanced mass, wherein each unbalanced torque is defined as:

$$U = m \times r,$$

where:

U is the unbalanced torque of a respective unbalanced mass part, m is an inertial mass of the unbalanced mass part acting in the center of mass of a respective unbalanced mass part, and r is a radial distance of the center of mass of a respective unbalanced mass part to the assigned oscillation/vibration axis of rotation.

Further, it may be provided, when taking into account the comparatively short movement paths of the respective second unbalanced mass parts between their end positions to achieve the total unbalanced torques to be respectively set at the two unbalanced masses, that the first unbalanced mass part of the at least one first unbalanced mass has a greater unbalanced torque than the first unbalanced mass part of the at least one second unbalanced mass, and that the second unbalanced mass part of the at least one first unbalanced mass has a smaller unbalanced torque than the second unbalanced mass part of the at least one second unbalanced mass.

The invention further relates to a soil compactor comprising at least one compactor roller with the previously described structure according to the invention.

BRIEF DESCRIPTION OF THE DRAWINGS

The present invention is subsequently described in detail with reference to the appended figures. As shown in.

DETAILED DESCRIPTION

Figure 1:
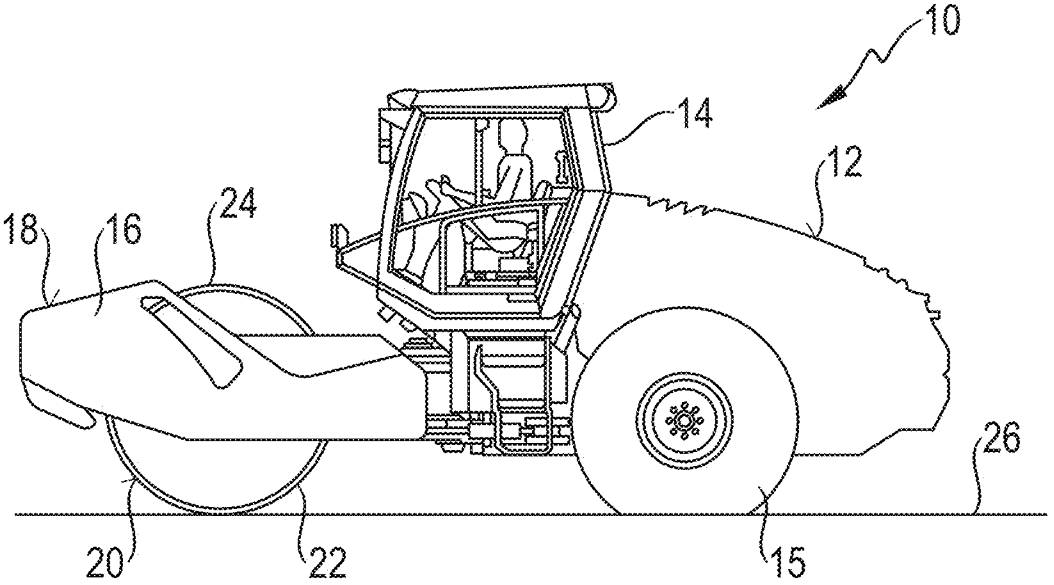
FIG. 1 a side view of a soil compactor with a compactor roller.

In FIG. 1, a soil compactor is generally designated with 10. Soil compactor 10, for example, usable for compacting asphalt material, soil, gravel, or other bonded or unbonded soil material, comprises a rear vehicle segment 12 with a cabin 14 for an operator supported thereon. A drive assembly is provided on rear vehicle segment 12, by means of which drive wheels 15, arranged on rear vehicle segment 12, are driven to move soil compactor 10 in a forward direction or in a reverse direction.

A front end 18, constructed with a frame 16, is pivotably supported on rear vehicle segment 12. Soil compactor 10 may be steered by pivoting front end 18 about an approximately vertical axis with respect to rear vehicle segment 12. A compactor roller 20 is supported on frame 16 of front end 18 to be rotated about a roller axis of rotation W, depicted in FIG. 2. Compactor roller 20 may itself be driven to rotate about roller axis of rotation W, alternatively, it may be supported on frame 16 of front end 18 to be substantially freely rotatable about roller axis of rotation W. When carrying out a compacting process, compactor roller 20, comprising an outer surface 22 of a roller shell 24 enclosing a roller interior 23, rolls across substrate 26 to be compacted.

Figure 2:
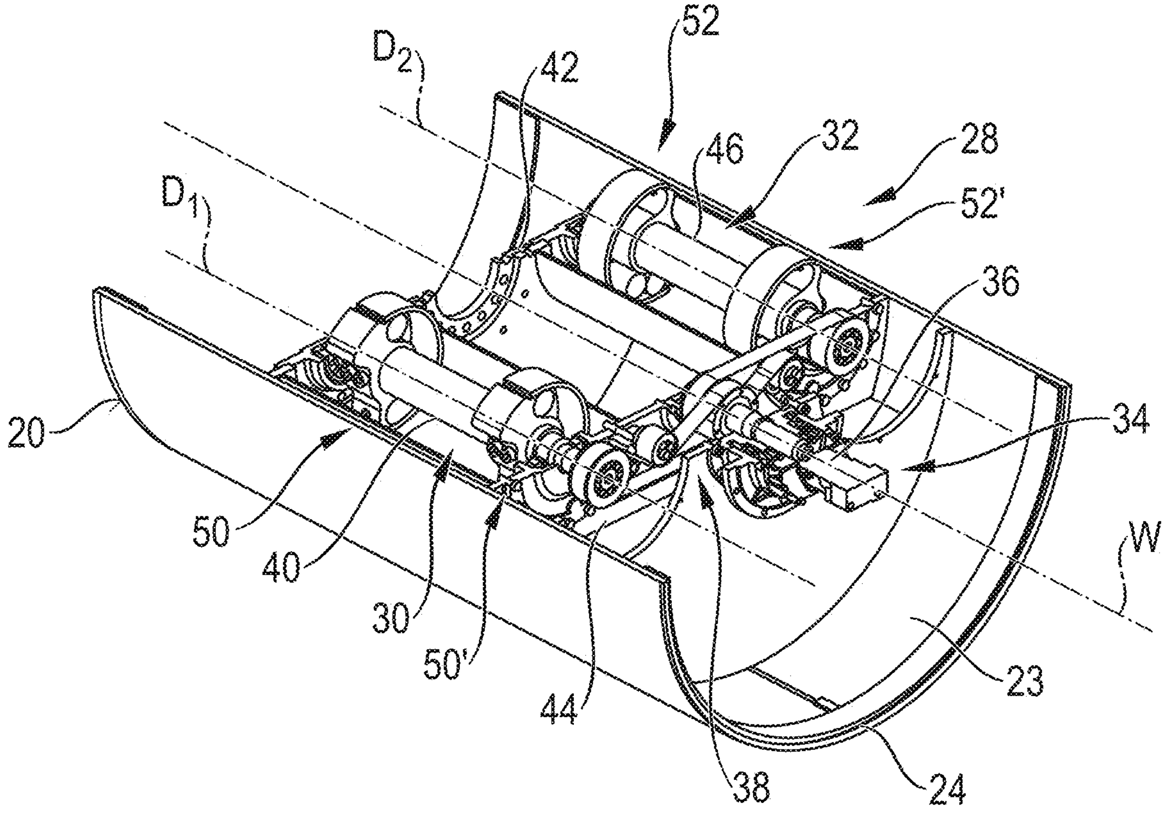
FIG. 2 a compactor roller, depicted in a longitudinal sectional view, with an oscillation/vibration assembly with two oscillation/vibration units.

An oscillation/vibration assembly, generally designated with 28, is provided in roller interior 23 of compactor roller 20, depicted in a longitudinal sectional view in FIG. 2. A force may be exerted on compactor roller 20 or on roller shell 24 of the same by oscillation/vibration assembly 28, in order to thereby influence the compacting behavior, as will be subsequently described in detail. In a subsequently described vibration operation, this force is oriented substantially orthogonal to roller axis of rotation W and the direction of the force rotates about roller axis of rotation W so that compactor roller 20 is driven in a vibration operation, in which, due to the rotating direction about roller axis of rotation W of the force acting on compactor roller 20, compactor roller 20 is periodically accelerated upwards and downwards, and thus periodically beats on substrate 26 to be compacted or is pressed against the same. In the oscillation operation of the oscillation/vibration assembly, the force exerted on compactor roller 20 is tangential or in the circumferential direction, so that roller shell 24 is periodically accelerated back and forth in the circumferential direction about roller axis of rotation W, and thus a walking effect arises in the compacting operation.

Oscillation/vibration assembly 28 comprises two oscillation/vibration units 30, 32. Each of oscillation/vibration units 30, 32 is drivable by an oscillation/drive 34 for rotation about a respective oscillation/vibration axis of rotation $D_1$ or $D_2$. Oscillation/vibration drive 34 may have, for example, a hydraulic motor 36, which drives both oscillation/vibration units 30, 32 via a belt drive transmission 38 to rotate about respectively assigned oscillation/vibration axis of rotation $D_1$ or $D_2$ in the same direction of rotation and at the same rotational speed.

First oscillation/vibration assembly 30 comprises a first oscillation/vibration shaft 40, which is rotatably supported at its two axial end areas on support disks 42, 44 connected to an inner circumferential surface of roller shell 24. Correspondingly, second oscillation/vibration unit 32 comprises a second oscillation/vibration shaft 46 rotatably supported on two support disks 42, 44.

Two first unbalanced masses 50, 50', preferably designed substantially identically to each other, are supported, spaced axially apart from one another, on first oscillation/vibration shaft 40 of first oscillation/vibration unit 30. Likewise, two second unbalanced masses 52, 52', preferably designed substantially identically to each other, are supported, spaced axially apart, on second oscillation/vibration shaft 46 of second oscillation/vibration unit 32. The arrangement is thereby such that, for example, each of both oscillation/vibration units 30, 32 respectively has an unbalanced mass 50, 50' or 52, 52' in the same axial area as the other of both oscillation/vibration units 30, 32. Furthermore, FIG. 2 clearly shows that both oscillation/vibration units 30, 32 are arranged so that their respective oscillation/vibration axes of rotation $D_1$, $D_2$ extend substantially parallel to roller axis of rotation W and also have the same distance from the same. Furthermore, both oscillation/vibration units 30, 32 or their oscillation/vibration axes of rotation $D_1$, $D_2$ have an angular spacing from one another of approximately 180° relative to roller axis of rotation W, such that both oscillation/vibration axes of rotation $D_1$, $D_2$ lie diametrically opposite one another relative to roller axis of rotation W.

First unbalanced masses 50, 50' or second unbalanced masses 52, 52' of both oscillation/vibration units 30, 32 will subsequently be described in detail with reference to FIGS. 3 and 4, wherein, due to the already-stated identical configuration of respective unbalanced masses 50, 50' or 52, 52' to each other, reference will only be made to first unbalanced mass 50 of first oscillation/vibration unit 30 or second unbalanced mass 52 of second oscillation/vibration unit 32.

Figure 3:
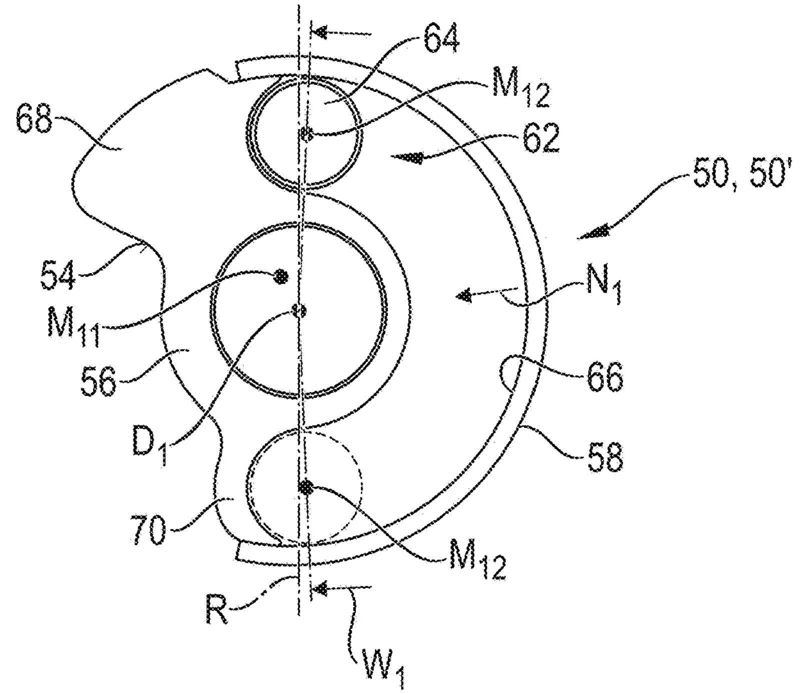
FIG. 3 an axial view of an unbalanced mass of a first of the two oscillation/vibration units.

First unbalanced mass 50, shown in FIG. 3 in an axial view and supported on first oscillation/vibration shaft 40, comprises a first unbalanced mass part 54 connected rotationally fixed to first oscillation/vibration shaft 40, for example by screwing and/or by a material connection. First unbalanced mass part 54 has an unbalanced mass element 56 fixed on first oscillation/vibration shaft 40 and a guideway element 58 fixedly connected to unbalanced mass element 56. Unbalanced mass element 56 and guideway element 58 delimit an accommodation space 60 for a second unbalanced mass part 62 of first unbalanced mass 50 movable with respect to first unbalanced mass part 54 of unbalanced mass 50.

In the depicted embodiment, second unbalanced mass part 62 comprises a substantially cylindrical first rolling body 64, thus designed like a roller, which is subjected to a radially outward load by centrifugal force in the rotational state of first unbalanced mass 50 and is pressed against a first guideway 66, oriented radially inwardly and provided on guideway element 58. Radially-inwardly oriented first guideway 66 has a substantially constant distance to first oscillation/vibration axis of rotation $D_1$ in the circumferential direction about the same, so that a radially-inwardly oriented guideway surface normal $N_1$ of first guideway 66 is oriented substantially radially inwardly with respect to first oscillation/vibration axis of rotation $D_1$. Accommodation space 60 may be closed in the axial direction, for example by disk-like cover elements, in order to prevent the rolling body from falling axially out of accommodation space 60. These cover elements thus already provide a part of respective first unbalanced mass part 54 and contribute to its mass or to its unbalanced torque.

Rolling body 64, substantially providing second mass part 62, is movable along first guideway 66 in accommodation space 60 between two end positions. In FIG. 3, first rolling body 64 is positioned in its second end position, in which this is supported on unbalanced mass element 56 in the circumferential direction and is positioned close to an unbalanced mass section 68 of unbalanced mass element 56. A large part of the mass of unbalanced mass element 56 is provided in unbalanced mass section 68, so that, for the positioning of second unbalanced mass part 62 depicted in FIG. 3 in its second end position, the center of mass of first unbalanced mass part 50 is positioned substantially above first oscillation/vibration axis of rotation $D_1$, and thus the centrifugal force acting during the rotation of first unbalanced mass 50 in this state is directed substantially upward.

After movement of second unbalanced mass part 62 along first guideway 66, second unbalanced mass part 62 arrives in its first end position, depicted in FIG. 3 with a dashed line, in which first rolling body 64 of second unbalanced mass part 62 is supported on a support section 70 of unbalanced mass element 56 in the circumferential direction. In this state as well, in the rotational positioning of first unbalanced mass 50 depicted in FIG. 3, the center of mass of the same is arranged substantially above first oscillation/vibration axis of rotation $D_1$. Due to the circumstance that a large part of the total mass of first unbalanced mass 50 is now positioned in the lower area of first unbalanced mass 50, the center of mass of first unbalanced mass 50 has a smaller radial distance from first oscillation/vibration axis of rotation $D_1$, so that the unbalanced torque present in this state or in this rotational positioning of first unbalanced mass 50 is smaller than an unbalanced torque which first unbalanced mass 50 has, when second unbalanced mass part 62 is in its second end position depicted above in FIG. 2 or 3. Due to this, the centrifugal force occurring in the positioning of second unbalanced mass part 62 in its second end position is smaller than in a state in which second mass part 62 is in its first end position, supported in the circumferential direction by unbalanced mass section 68.

It is clear in FIG. 3, that, in the positioning of second unbalanced mass part 62 in its second end position, a center of mass $M_{12}$ of second unbalanced mass part 62 and a center of mass $M_{11}$ of first unbalanced mass part 54 of first unbalanced mass 50 or 50' lie offset to one another in the circumferential direction and therefore do not lie on a common radial line intersecting first oscillation/vibration axis of rotation $D_1$. This type of radial line, intersecting first oscillation/vibration axis of rotation $D_1$, is illustrated in FIG. 3 by way of radial line R, corresponding approximately to a vertical line in this rotational state. Centers of mass $M_{11}$ and $M_{12}$ lie in the circumferential direction on both sides of this radial line R.

After moving the second unbalanced mass part into its first end position, centers of mass $M_{11}$ and $M_{12}$ also lie in the circumferential direction on both sides of radial line R, since, during movement between the second end position and the first end position, first unbalanced mass part 62 or its center of mass $M_{12}$ moves along assigned guideway 66 about first oscillation/vibration axis of rotation $D_1$ by an angle $W_1$ of less than 180°. In each of the two end positions of second unbalanced mass part 62 of respective first unbalanced mass 50, 50', the center of mass of unbalanced mass 50 or 50' therefore lies, in the rotational state depicted in FIG. 3, on radial line R and above first oscillation/vibration axis of rotation $D_1$; however with a different radial distance to the same, so that, in the positioning of second unbalanced mass part 62 in its second end position, a greater unbalanced torque of respective first unbalanced mass 50 or 50' results than in the positioning of second unbalanced mass part 62 in its second end position.

Figure 4:
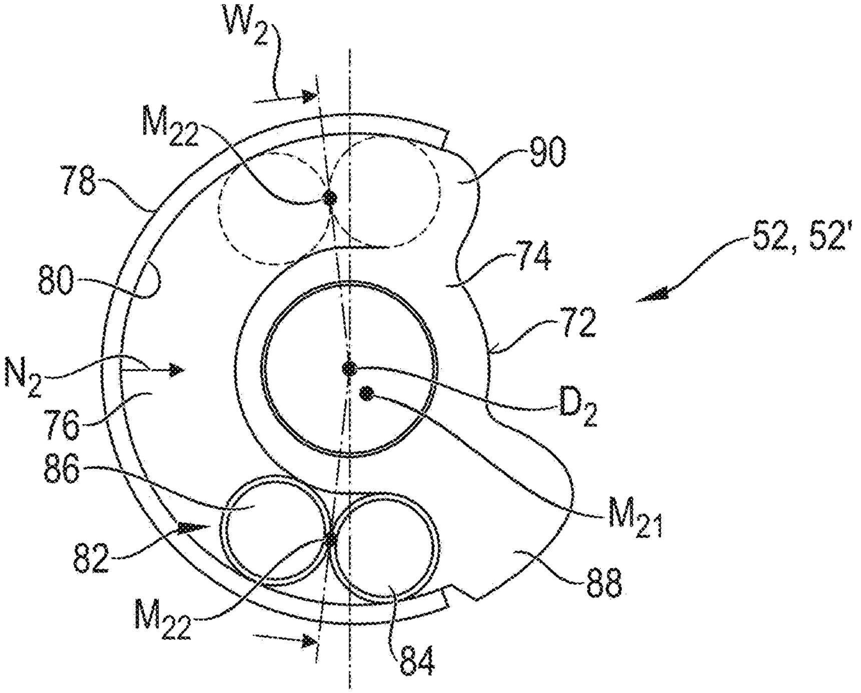
FIG. 4 an axial view of an unbalanced mass of the second of the oscillation/vibration units.

FIG. 4 shows the structure of second unbalanced mass 52, which corresponds in principle to the structure of first unbalanced mass 50. Second unbalanced mass 52 has a first unbalanced mass part 72, which is held rotationally fixedly on second oscillation/vibration shaft 46 and is also designed with an unbalanced mass element 74 and a guideway element 78 mutually delimiting an accommodation space 76 with the same. A radially-inwardly oriented second guideway 80, whose guideway surface normal $N_2$ is oriented substantially radially inwardly toward second oscillation/vibration axis of rotation $D_2$, is formed on guideway element 78.

A second unbalanced mass part 82 of second unbalanced mass 52 is accommodated in accommodation space 76 to be movable in the circumferential direction relative to first unbalanced mass part 72 about second oscillation/vibration axis of rotation $D_2$. Second unbalanced mass part 82 of second unbalanced mass 52 comprises two second rolling bodies 84, 86, designed identically, for example, to one another and also to first rolling body 64 of second unbalanced mass part 62 of first unbalanced mass 50. Second rolling bodies 84, 86 may move in accommodation space 76, rolling along second guideway 80, between the second end position of the same or of second unbalanced mass part 82, depicted below in FIG. 4, in which second rolling bodies 84, 86 are supported on an unbalanced mass section 88 of unbalanced mass element 74, and a first end position, depicted above in FIG. 4, in which second rolling bodies 84, 86 are supported in the circumferential direction on a support section 90 of unbalanced mass element 74 of first unbalanced mass part 72 of second unbalanced mass 52. Accommodation space 76 may be closed in the axial direction, for example by disk-like cover elements, in order to prevent the rolling body from falling axially out of accommodation space 76. These cover elements thus already provide a part of respective first unbalanced mass part 72 and contribute to its mass or to its unbalanced torque.

By positioning second rolling bodies 84, 86 of second unbalanced mass part 82 of second unbalanced mass 52 in the second end position, depicted below in FIG. 4, the center of mass of second unbalanced mass 52 lies substantially below second oscillation/vibration axis of rotation $D_2$ in the rotational state of second unbalanced mass 52 depicted in FIG. 4. Since a majority of the mass of second unbalanced mass part 52 is arranged below second oscillation/vibration axis of rotation $D_2$ and approximately in the same circumferential area, second unbalanced mass 52 has in this state a comparatively large unbalanced torque, since the center of mass of second unbalanced mass 52 has a comparatively large radial distance from second oscillation/vibration axis of rotation $D_2$ due to this mass distribution.

If second unbalanced mass part 82 of second unbalanced mass 52 is in its first end position, depicted above in FIG. 4, a larger part of the mass of second unbalanced mass 52 is moved upward. This leads to the fact that, in this state, the center of mass of second unbalanced mass 52 or 52' lies substantially above second oscillation/vibration axis of rotation $D_2$ in the rotational position depicted in FIG. 4; however, it has a smaller radial distance to the same than when second unbalanced mass part 82 is positioned in the second end position. This means that, when second mass part 82 is positioned in the first end position, the centrifugal force acting in the center of mass is smaller than when the second mass part 82 is positioned in the second end position.

For respective second unbalanced masses 50 or 52', this switching behavior is also achieved in that, in both end positions of second unbalanced mass part 82, a center of mass $M_{22}$ of second unbalanced mass part 82 and a center of mass $M_{21}$ of first unbalanced mass part 72 lie offset to one another in the circumferential direction and thus do not lie on a common radial line intersecting second oscillation/vibration axis of rotation $D_2$, but instead lie on both sides of radial line R, substantially corresponding to a vertical direction, in this rotational state. This is also achieved in that, in the movement between the two end positions, second unbalanced mass part 82 of second unbalanced mass 52 or 52' or its center of mass $M_{22}$ moves about second oscillation/vibration axis of rotation $D_2$ with an angle $W_2$ of less than 180°. In particular, to maintain the desired enveloping behavior, angle $W_2$ is smaller than angle $W_1$.

It arises from the previously described structural design of both unbalanced masses 50, 52, that when respective second mass parts 62 or 82 are moved between their first end position and their second end position, for first unbalanced mass 50, the center of mass of first unbalanced mass 50 is indeed radially displaced, however undergoes no movement in the circumferential direction with respect to first unbalanced mass part 54; while, for second unbalanced mass 52, the center of mass is radially displaced on the one hand and displaced in the circumferential direction about second oscillation/vibration axis of rotation $D_2$ by an angle of 180° on the other hand. This has the result that, when both unbalanced masses 50, 52 are positioned to one another, as depicted in FIGS. 3 and 4, and respective second unbalanced mass parts 62 or 82 are in their respective second end position, thus are respectively supported in the circumferential direction on unbalanced mass sections 68 or 88, which is the case in the depictions of FIGS. 3 and 4 during rotation of unbalanced masses 50, 52 in the clockwise direction, the centers of mass of both unbalanced masses 50, 52 have an angular offset of 180° to one another, since for first unbalanced mass 50, the center of mass lies substantially above first oscillation/vibration axis of rotation $D_1$, and for second unbalanced mass 52, the center of mass lies substantially below second oscillation/vibration axis of rotation $D_2$.

In order to ensure that the respectively acting unbalanced torque of both unbalanced masses 50, 52 is the same, thus the centrifugal forces acting on the respective centers of mass, or represented by the same, are the same, for first unbalanced mass part 54 of first unbalanced mass 50, unbalanced mass section 68 is designed with a greater volume and thus a greater mass than unbalanced mass section 88 of first unbalanced mass part 72 of second unbalanced mass 52. Thus, the situation is compensated, that second unbalanced mass part 82 of second unbalanced mass 52 has double the mass as second unbalanced mass part 62 of first unbalanced mass 50.

If, for both unbalanced masses 50, 52, second unbalanced mass parts 62 or 82 are respectively supported on support section 70 or 90 of first unbalanced mass part 54 or 72, which is the case during rotation of unbalanced masses 50, 52 in the depiction of FIG. 4 in the counter-clockwise direction, the center of mass lies above oscillation/vibration axis of rotation $D_1$, $D_2$ for both unbalanced masses 50, 52. Due to the mass distribution present in this state, for each of unbalanced masses 50, 52, the center of mass has a smaller radial distance to respective oscillation/vibration axis of rotation $D_1$, $D_2$, so that the centrifugal force acting on the respective center of mass, or represented by the same, is smaller in rotational operation, wherein, however, the two centrifugal forces acting on unbalanced masses 50, 52 have the same orientation.

The effect, arising from the previously described switching behavior of unbalanced masses 50, 50' or 52, 52' of both oscillation/vibration units 30, 32 of oscillation/vibration assembly 28, is subsequently described in the operation of compactor roller 20 or soil compactor 10, with reference to FIGS. 5 and 6.

Figure 5:
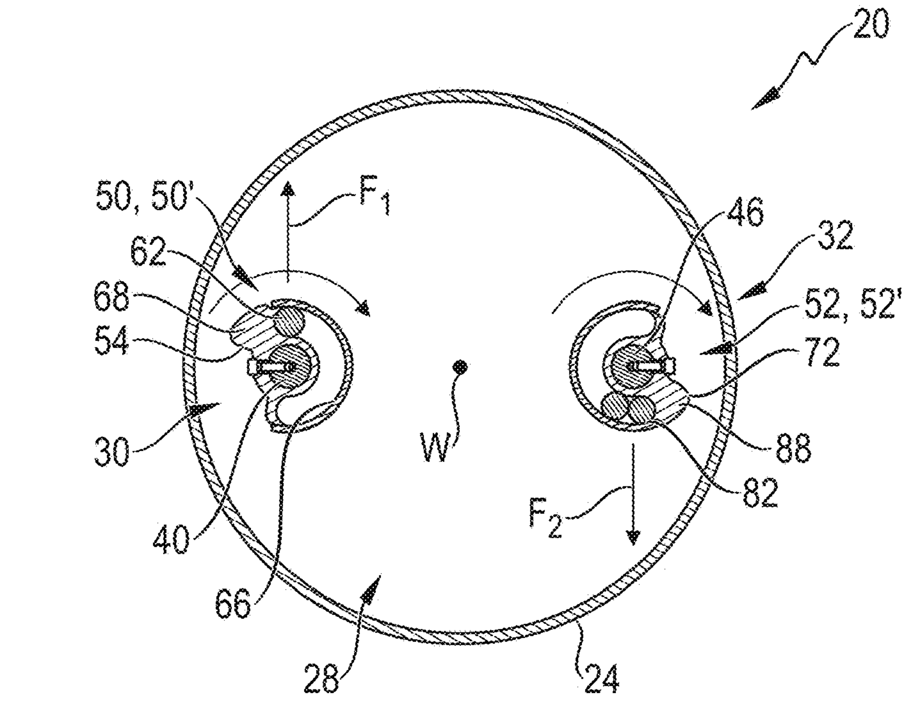
FIG. 5 a depiction of the principle of the compactor roller from FIG. 2 in an axial view in an oscillation operation of the oscillation/vibration assembly.

FIG. 5 shows compactor roller 20 in an oscillation operation of oscillation/vibration assembly 28. Both oscillation/vibration units 30, 32 rotate about respectively assigned oscillation/vibration axis of rotation $D_1$ or $D_2$ in the clockwise direction and at the same rotational speed in the view from FIG. 5. Second unbalanced mass parts 62 or 82 of unbalanced masses 50, 50', 52, 52' are in their respective second end position, so that rolling bodies 64 or 84, 86 are supported on respective unbalanced mass section 68 or 88 in the circumferential direction or are carried along by the same to move in the circumferential direction. Rolling bodies 64 or 84, 86 are supported radially outwardly on first guideway 66 or second guideway 80. In the rotational state depicted in FIG. 5, the center of mass of first unbalanced masses 50, 50' lie in the vertical direction above first oscillation/vibration axis of rotation $D_1$, so that centrifugal force $F_1$ acting on first unbalanced masses 50, 50', is directed substantially vertically upward. For second unbalanced masses 52, 52', the center of mass lies vertically, or in the vertical direction, below second oscillation/vibration axis of rotation $D_2$, so that centrifugal force $F_2$ arising at second unbalanced masses 52, 52' is directed substantially vertically downward. Due to the masses, predefined for respective first unbalanced mass parts 54 or 72 on the one hand and respective second unbalanced mass parts 62 or 82 on the other hand, and thus also the unbalanced torques present at respective first and second unbalanced mass parts 54, 72, 62, 82, centrifugal forces $F_1$, $F_2$, directed opposite one another, have the same centrifugal force value. Thus, a torque, acting about roller axis of rotation W occurs, which periodically changes its direction in the course of the rotation of both oscillation/vibration units 30, 32, so that compactor roller 20 or its roller shell 24 is periodically accelerated back in forth in the circumferential direction about roller axis of rotation W. Compactor roller 20 or oscillation/vibration assembly 28 thus operates in an oscillation operation.

Figure 6:
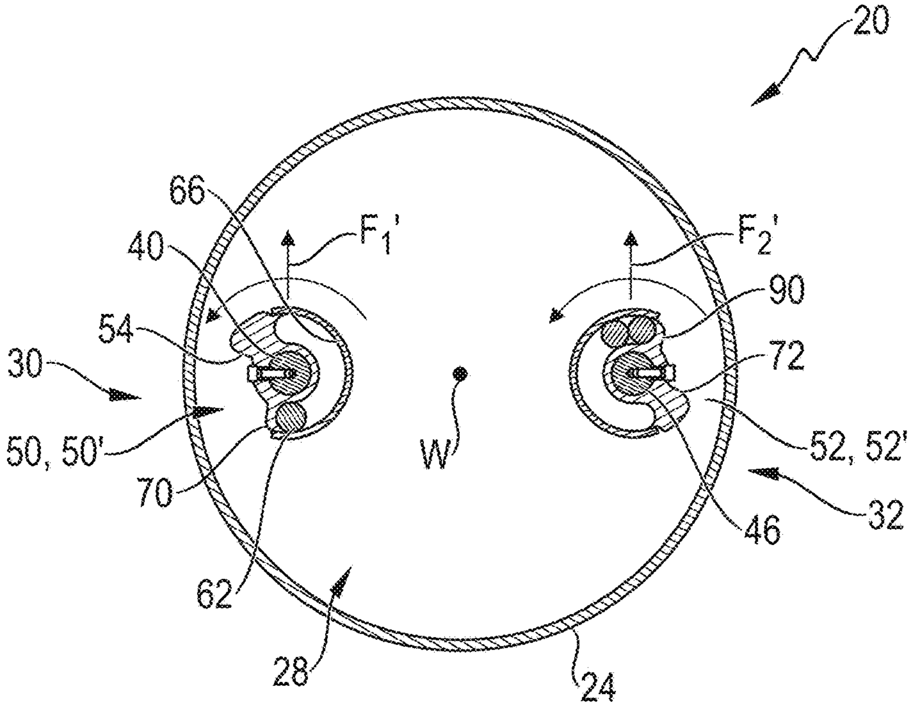
FIG. 6 a view, corresponding to FIG. 5, in a vibration operation of the oscillation/vibration assembly.

In FIG. 6, both oscillation/vibration units 30, 32 are depicted in a rotational state in which the direction of rotation is reversed in comparison to the rotational state from FIG. 5. Oscillation/vibration units 30, 32 rotate at the same rotational speed in the counter-clockwise direction.

During the transition from the rotational state of FIG. 5 to the rotational state of FIG. 6, second unbalanced mass parts 62 or 82 move in respective accommodation space 60 or 76 by a rolling movement of rolling bodies 64 or 84, 86 along first guideway 66 or second guideway 80 in the circumferential direction relative to respective first unbalanced mass part 54 or 72, so that they arrive in the respective first end position. In this state, second unbalanced mass parts 62 or 82 are supported in the circumferential direction on respective support section 70 or 90 and are carried along by the same to move in the circumferential direction.

For each of two unbalanced masses 50, 50', 52, 52' in the rotational state depicted in FIG. 6, the center of mass lies above respective oscillation/vibration axis of rotation $D_1$, $D_2$; however, with a smaller radial distance from the same than in the oscillation operation depicted in FIG. 5. This has the result that centrifugal forces $F_1'$ and $F_2'$, acting on the centers of mass of unbalanced masses 50, 50', 52, 52' are now oriented the same, thus do not have a phase offset to one another; however, they have a smaller centrifugal force value than in the oscillation operation depicted in FIG. 5.

In the rotational state of oscillation/vibration units 30, 32, depicted in FIG. 6, both centrifugal forces $F_1'$, $F_2'$ add to a total centrifugal force, which is radially directed with respect to roller axis of rotation W. Compactor roller 20 or oscillation/vibration assembly 28 thus functions in vibration operation, in which, during the rotation of oscillation/vibration units 30, 32, due to adding centrifugal forces $F_1'$, $F_2'$ in each rotational position, the total centrifugal force thus generated rotates about roller axis of rotation, W and thus compactor roller 20 is periodically accelerated upward and downward, and correspondingly periodically loads substrate 26 to be compacted.

In the previously described switch between an oscillation operation and a vibration operation, it is ensured, due to the mass distribution in both oscillation/vibration units 30, 32 or first unbalanced masses 50, 50' and second unbalanced masses 52, 52' of the same, that centrifugal forces $F_1$, $F_2$ or $F_1'$, $F_2'$, acting on the respective centers of mass, each have the same centrifugal force value; however, that in the oscillation operation, the centrifugal forces are oriented opposite one another, which is achieved in that unbalanced masses 50, 50' or their respective center of mass have a phase offset of approximately 180° with respect to second unbalanced masses 52, 52' or their respective center of mass, while in the vibration operation depicted in FIG. 6, centrifugal forces $F_1'$, $F_2'$, acting on oscillation/vibration units 30, 32, have a lower centrifugal force value, however, are oriented identically to one another, which is achieved in that, due to the mass distribution in respective unbalanced masses 50, 50', 52, 52', both oscillation/vibration units 30, 32 do not have a phase offset to one another.

To achieve this, both second unbalanced mass parts 62, 82 not only differ with respect to one another in their masses, and thus in the unbalanced torque respectively provided, but also first unbalanced mass parts 54, 72 differ from one another in their mass, and thus the unbalanced torque thereby provided. Further, first unbalanced mass part 54 of each first unbalanced mass 50, 50' substantially corresponds, with respect to the unbalanced torque thereby provided, to the unbalanced torque of respective second unbalanced mass parts 82 of second unbalanced masses 52, 52'. Similarly, first unbalanced mass parts 72 of second unbalanced masses 52, 52' substantially correspond, with respect to the unbalanced torques thereby provided, to the unbalanced torque of respective second unbalanced mass parts 62 of second unbalanced masses 50, 50'.

By switching between oscillation operation and vibration operation with different centrifugal force values, it is also achieved in particular that a periodic movement of compactor roller 20 occurs with a smaller centrifugal force value in vibration operation than is the case in oscillation operation. This offers the potential of working in vibration operation with a greater rotational speed and thus greater frequency than in oscillation operation, without an excessively high increase in the load of the bearings supporting oscillation/vibration shafts 40, 46. Since the level of change of the centrifugal force values during the transition from oscillation operation to vibration operation is predeterminable in a large range of values, due to the corresponding selection of the masses or mass distributions of unbalanced mass parts 54, 62 or 72, 82 and the radial positions of guideways 66, 80, the change of the rotational speed, enabled by this switching behavior and thus the frequency, with which compactor roller 20 is periodically loaded, are also freely determinable across a large range of values.

Reference is finally made to the fact that the previously described structure may naturally varied in the most different aspects, without deviating from the functional principle or from the structural principle. Thus, for example, only one unbalanced mass or more than two unbalanced masses may respectively be provided for the oscillation/vibration units. The condition is, however that the same unbalanced torque is respectively present for each of the oscillation/vibration units. The second unbalanced mass parts could also be respectively configured differently. Thus, the second rolling bodies provided for the second unbalanced masses could have a different dimensioning or a different configuration than the first rolling body provided for the respective first unbalanced masses. The different masses of the respective second unbalanced mass parts may, for example, also be achieved in that substantially identically dimensioned rolling bodies may have different masses. For example, the first rolling body, provided with a lower mass, may be designed as a hollow body for the first unbalanced masses, a second rolling body, provided for the respective second unbalanced masses, may be designed as more massive rolling body and thus with a greater mass.

The structure or the mass distribution of the different unbalanced masses may also be changed, in comparison to the previously described configuration depicted in the figures, so that, for first oscillation/vibration unit 30 or unbalanced masses 50, 50' of the same, centers of mass $M_{11}$, $M_{12}$ of both unbalanced mass parts 54, 62 are reversed in their position relative to radial line R, in comparison to the arrangement depicted in FIG. 3, so that center of mass $M_{11}$ of first unbalanced mass part 54 lies to the right of substantially vertically extending radial line R in the rotational state depicted, and center of mass $M_{12}$ of second unbalanced mass part 62 lies to the left of radial line R in both end positions. In this case, center of mass $M_{12}$ of second unbalanced mass part 62 moves during movement between the two end positions in an angle $W_1$ which is greater than 180°.

Alternatively or additionally, it may be provided that, for second oscillation/vibration unit 32 or unbalanced masses 52, 52' of the same, centers of mass $M_{21}$, $M_{22}$ of both unbalanced mass parts 72, 82 are reversed in their position relative to radial line R, in comparison to the arrangement depicted in FIG. 4, so that center of mass $M_{21}$ of first unbalanced mass part 72 lies to the left of substantially vertically extending radial line R in the rotational state depicted, and center of mass $M_{22}$ of second unbalanced mass part 82 lies to the right of radial line R in both end positions. In this case, center of mass $M_{22}$ of second unbalanced mass part 82 moves during movement between the two end positions in an angle $W_2$ which is greater than 180°.

If both angles $W_1$, $W_2$ are greater than 180°, angle $W_2$ is greater than angle $W_1$ in order to achieve a suitable enveloping behavior with respect to the unbalanced torques to be set.

Configurations are basically also conceivable, in which one of angles $W_1$, $W_2$ is smaller than 180° and the other is greater than 180°, or one of angles $W_1$, $W_2$ is exactly 180°.

The invention claimed is:

1. Compactor roller for a soil compactor, comprising a roller shell, rotatable about a roller axis of rotation and surrounding a roller interior, an oscillation/vibration assembly arranged in the roller interior, wherein the oscillation/vibration assembly comprises:

a first oscillation/vibration unit with at least one first unbalanced mass driveable for rotation about a first oscillation/vibration axis of rotation, wherein the at least one first unbalanced mass comprises a first unbalanced mass part and a second unbalanced mass part, the second unbalanced mass part of the at least one first unbalanced mass being movable with respect to the first unbalanced mass part about the first oscillation/vibration axis of rotation between a first end position thereof and a second end position of the second unbalanced mass part of the at least one first unbalanced mass, wherein, during rotation of the at least one first unbalanced mass about the first oscillation/vibration axis of rotation in a first direction of rotation, the second unbalanced mass part of the at least one first unbalanced mass is in the first end position of the second unbalanced mass part of the at least one first unbalanced mass, and during rotation of the at least one first unbalanced mass about the first oscillation/vibration axis of rotation in a second direction of rotation opposite to the first direction of rotation, the second unbalanced mass part of the at least one first unbalanced mass is in the second end position of the second unbalanced mass part of the at least one first unbalanced mass, wherein during movement of the second unbalanced mass part of the at least one first unbalanced mass between the first end position of the second unbalanced mass part of the at least one first unbalanced mass and the second end position of the second unbalanced mass part of the at least one first unbalanced mass, a center of mass of the second unbalanced mass part of the at least one first unbalanced mass moves about the first oscillation/vibration axis of rotation in a first predetermined angle, a second oscillation/vibration unit with at least one second unbalanced mass driveable for rotation about a second oscillation/vibration axis of rotation, wherein the at least one second unbalanced mass comprises a first unbalanced mass part and a second unbalanced mass part, the second unbalanced mass part of the last least one second unbalanced mass being movable with respect to the first unbalanced mass part about the second oscillation/vibration axis of rotation between a first end position thereof and a second end position of the second unbalanced mass part of the at least one second unbalanced mass, wherein, during rotation of the at least one second unbalanced mass about the second oscillation/vibration axis of rotation in the first direction of rotation, the second unbalanced mass part of the at least one second unbalanced mass is in the first end position of the second unbalanced mass part of the at least one second unbalanced mass, and during rotation of the at least one second unbalanced mass about the second oscillation/vibration axis of rotation in the second direction of rotation, the second unbalanced mass part of the at least one second unbalanced mass is in the second end position of the second unbalanced mass part of the at least one second unbalanced mass, wherein during movement of the second unbalanced mass part of the at least one second unbalanced mass between the first end position thereof and the second end position of the second unbalanced mass part of the at least one second unbalanced mass, a center of mass of the second unbalanced mass part of the at least one second unbalanced mass moves about the second oscillation/vibration axis of rotation in a second predetermined angle, wherein, when the second unbalanced mass part of the at least one first unbalanced mass is positioned in the first end position of the second unbalanced mass part of the at least one first unbalanced mass and the second unbalanced mass part of the at least one second unbalanced mass, is positioned in the first end position of the second unbalanced mass part of the at least one second unbalanced mass, a center of mass of the at least one first unbalanced mass and a center of mass of the at least one second unbalanced mass do not have a phase offset to one another, and a first centrifugal force acting in the center of mass of the at least one first unbalanced mass and a second centrifugal for acting in the center of mass of the at least one second unbalanced mass are oriented identically to one another and have an identical first centrifugal force value, wherein, when the second unbalanced mass part of the at least one first unbalanced mass is positioned in the second end position of the second unbalanced mass part of the at least one first unbalanced mass and the second unbalanced mass part of the at least one second unbalanced mass is positioned in the second end position of the second unbalanced mass part of the at least one second unbalanced mass, the center of mass of the at least one first unbalanced mass and the center of mass of the at least one second unbalanced mass have a phase offset of 180° to one another and the first centrifugal force acting in the center of mass of the at least one first unbalanced mass and the second centrifugal force acting in the center of mass of the at least one second unbalanced mass are oriented opposite to one another and have an identical second centrifugal force value, wherein the first predetermined angle is less than 180° or greater than 180°, and/or that the second predetermined angle is less than 180° or greater than 180°.

2. Compactor roller according to claim 1, wherein at least one of:

when the second unbalanced mass part of the at least one first unbalanced mass is positioned in the second end position of the second unbalanced mass part of the at least one first unbalanced mass, the center of mass of the second unbalanced mass part of the at least one first unbalanced mass and a center of mass of the first unbalanced mass part of the at least one first unbalanced mass do not lie on a common radial line intersecting the first oscillation/vibration axis of rotation, and when the second unbalanced mass part of the at least one second unbalanced mass is positioned in the second end position of the second unbalanced mass part of the at least one second unbalanced mass, the center of mass of the second unbalanced mass part of the at least one second unbalanced mass, and a center of mass of the first unbalanced mass part of the at least one second unbalanced mass do not lie on a common radial line intersecting the second oscillation/vibration axis of rotation.

3. Compactor roller according to claim 2, wherein at least one of:

when the second unbalanced mass part of the at least one first unbalanced mass is positioned in the first end position of the second unbalanced mass part of the at least one first unbalanced mass and the second unbalanced mass part of the at least one first unbalanced mass is positioned in the second end position of the second unbalanced mass part of the at least one first unbalanced mass, the center of mass of the second unbalanced mass of the at least one first unbalanced mass and the center of mass of the first unbalanced mass part of the at least one first unbalanced mass in the circumferential direction lie on both sides of a radial line intersecting the first oscillation/vibration axis of rotation, and when the second unbalanced mass part of the at least one second unbalanced mass is positioned in the first end position of the second unbalanced mass part of the at least one second unbalanced mass and the second unbalanced mass part of the at least one second unbalanced mass is positioned in the second end position of the second unbalanced mass part of the at least one second unbalanced mass, the center of mass of the second unbalanced mass part of the at least one second unbalanced mass, and the center of mass of the first unbalanced mass part of the at least one second unbalanced mass in the circumferential direction lie on both sides of a common radial line intersecting the second oscillation/vibration axis of rotation.

4. Compactor roller according to claim 1, wherein:

- when the first predetermined angle and the second predetermined angle are less than 180°, the first predetermined angle is greater than the second predetermined angle, and
- when the first predetermined and the second predetermined are greater than 180°, the first predetermined angle is smaller than the second predetermined angle.

5. Compactor roller according to claim 1, wherein:

a first guideway with a radially-inwardly oriented guideway surface normal is provided on first unbalanced mass part of the at least one first unbalanced mass for a movement of the second unbalanced mass part of the at least one first unbalanced mass, supported radially outwardly on the first guideway, between its first end position and its second end position, and a second guideway with a radially-inwardly oriented guideway surface normal is provided on first unbalanced mass part of the at least one second unbalanced mass for a movement of the second unbalanced mass part of the at least one first unbalanced mass, supported radially outwardly on the second guideway, between its first end position and its second end position.

6. Compactor roller according to claim 5, wherein a circumferential extension of the first guideway is restricted to a partial circumferential area about the first oscillation/vibration axis of rotation and a circumferential extension of the second guideway is restricted to a partial circumferential area about the second oscillation/vibration axis of rotation.

7. Compactor roller according to claim 5, wherein a radial distance of the first guideway to the first oscillation/vibration axis of rotation corresponds to a radial distance of the second guideway to the second oscillation/vibration axis of rotation.

8. Compactor roller according to claim 5, wherein:

the second unbalanced mass part of the at least one first unbalanced mass comprises at least one first rolling body arranged for rolling along the first guideway during a movement of the second unbalanced mass part of the at least one first unbalanced mass between the first end position of the second unbalanced mass part of the at least one first unbalanced mass and the second end position of the second unbalanced mass part of the at least one first unbalanced mass and the second unbalanced mass part of the at least one second unbalanced mass comprises at least one second rolling body arranged for rolling along the second guideway during a movement of the second unbalanced mass part of the at least one second unbalanced mass between the first end position of the second unbalanced mass part of the at least one second unbalanced mass and the second end position of the second unbalanced mass part of the at least one second unbalanced mass.

9. Compactor roller according to claim 8, wherein the number of first rolling bodies differs from the number of second rolling bodies.

10. Compactor roller according to claim 8, wherein all first rolling bodies and all second rolling bodies are designed identically to one another.

11. Compactor roller according to claim 8, wherein at least one first rolling body differs from at least one second rolling body.

12. Compactor roller according to claim 1, wherein at least one of:

the first oscillation/vibration axis of rotation and the second oscillation/vibration axis of rotation are arranged parallel to one another and to the roller axis of rotation, and the first oscillation/vibration axis of rotation and the second oscillation/vibration axis of rotation have an angular distance of approximately 180° with respect to the roller axis of rotation.

13. Compactor roller according to claim 1, wherein:

the first unbalanced mass part of the at least one first unbalanced mass is supported on a first oscillation/vibration shaft, rotatably drivable about the first oscillation/vibration axis of rotation and/or the first oscillation/vibration shaft provides at least one part of the first unbalanced mass part of the at least one first unbalanced mass, and the first unbalanced mass part of the at least one second unbalanced mass is supported on a second oscillation/vibration shaft, rotatably drivable about the second oscillation/vibration axis of rotation, and/or the second oscillation/vibration shaft provides at least one part of the first unbalanced mass part of the at least one second unbalanced mass.

14. Compactor roller according to claim 1, wherein:

the oscillation/vibration assembly comprises an oscillation/vibration drive, and the at least one first unbalanced mass of the first oscillation/vibration unit and the at least one second unbalanced mass of the second oscillation/vibration unit are drivable by the oscillation/vibration drive to rotate in the same direction of rotation and at the same rotational speed.

15. Compactor roller according to claim 1, wherein at least one of:

the first oscillation/vibration unit comprises two first unbalanced masses, arranged spaced apart from one another in the direction of the first oscillation/vibration axis of rotation, and the second oscillation/vibration unit comprises two second unbalanced masses, arranged spaced apart from one another in the direction of the second oscillation/vibration axis of rotation.

16. Compactor roller according to claim 1, wherein the second centrifugal force value is greater than the first centrifugal force value.

17. Compactor roller according to claim 1, wherein:

an unbalanced torque of the first unbalanced mass part of the at least one first unbalanced mass corresponds to an unbalanced torque of the second unbalanced mass part of the at least one second unbalanced mass, and an unbalanced torque of the first unbalanced mass part of the at least one second unbalanced mass corresponds to an unbalanced torque of the second unbalanced mass part of the at least one first unbalanced mass, wherein each unbalanced torque is defined as:

$$U=m\times r;$$

where:

U is the unbalanced torque of a respective unbalanced mass part, m is an inertial mass of the unbalanced mass part acting in the center of mass of a respective unbalanced mass part, and r is a radial distance of the center of mass of a respective unbalanced mass part to the assigned oscillation/vibration axis of rotation.

18. Compactor roller according to claim 17, wherein:

the first unbalanced mass part of the at least one first unbalanced mass has a greater unbalanced torque than the first unbalanced mass part of the at least one second unbalanced mass, and the second unbalanced mass part of the at least one first unbalanced mass has a smaller unbalanced torque that the second unbalanced mass part of the at least one second unbalanced mass.

19. Soil compactor, comprising at least one compactor roller (20) according to claim 1.

* * * * *